June 10, 1930.  H. NÜTZELBERGER  1,763,175
INTEGRATING METER
Filed March 7, 1927
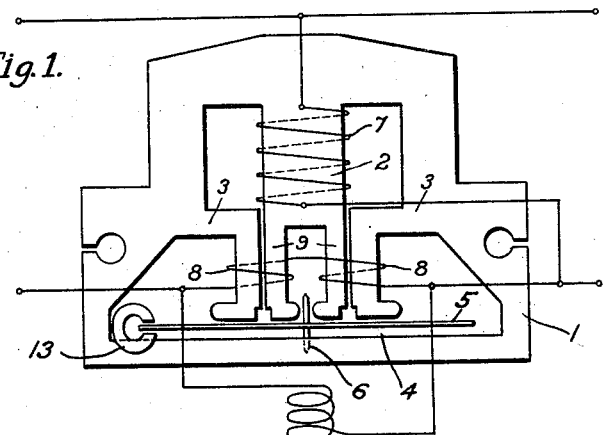
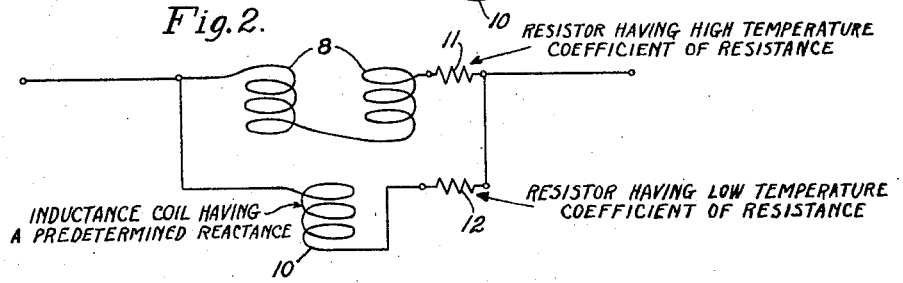
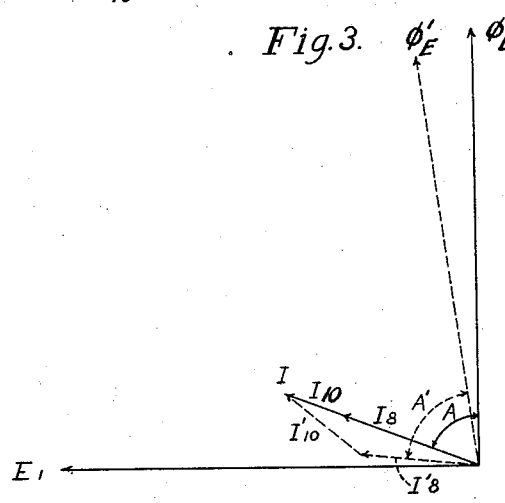
WITNESSES:
C. J. Weller.
Barnwell R. King
INVENTOR
Hans Nützelberger.
BY
Wesley J. Carr
ATTORNEY Patented June 10, 1930

1,763,175

UNITED STATES PATENT OFFICE

HANS NÜTZELBERGER, OF NUREMBERG, GERMANY, ASSIGNOR TO WESTINGHOUSE ELECTRIC & MANUFACTURING COMPANY, A CORPORATION OF PENNSYLVANIA

INTEGRATING METER

Application filed March 7, 1927, Serial No. 173,305, and in Germany March 8, 1926.

My invention relates to electrical measuring instruments and particularly to induction-motor meters.

An object of my invention is to provide means for causing a motor meter to operate independently of temperature variations.

Another object of my invention is to provide means, in the series circuit of a motor meter, for making the relative phase position and magnitude of the series current automatically responsive to temperature variations.

It is well known that induction-motor meters have a tendency to run fast with an increase of temperature above the normal operating temperature. In general, the reverse is true also; that is, a decrease in temperature will cause a decrease in the registration of the power flowing through the meter. These registration errors caused by temperature variations are especially aggravated when a load at some power factor other than unity is being metered.

Such registration error is in part caused by a change in the magnitude and the phase angle of the flux developed by the voltage coil, with an increase or decrease in temperature. Such change of the voltage-flux phase angle has a compensating effect because of the opposite action of the drag magnet with an increase in temperature, but this compensating effect is useful only at unity power factor.

In practicing my invention, I provide a reactance coil in shunt-circuit relation to the current winding that will so change the phase angle and magnitude of the current traversing the current winding as to compensate for not only the drag-magnet variations but also the voltage-flux variations resulting from temperature changes.

For a clear understanding of my invention, reference may be had to the accompanying drawings of which, Figure 1 is a diagrammatic view of a motor meter embodying my invention;

Fig. 2 is a diagrammatic view of the current circuit arrangement, and

Fig. 3 is a vector diagram of the actuating and compensating fluxes, as effected by my invention.

A laminated core 1 of a motor meter of substantially the form of a hollow rectangle having inwardly extending members 2 and 3 is shaped to provide an air gap 4 in which an armature disc 5 is free to rotate with a shaft 6.

A voltage winding 7 is disposed about the member 2, and a current winding 8 is disposed about the members 3 and 9 adjacent elements, the latter being extensions of the middle member 2.

An auxiliary winding 10, external to the laminated core 1 and in shunt-circuit relation to the current winding 8, is provided in the series circuit of the meter.

The coil 10 may be of any material, such as manganin, that has a low or negligible temperature coefficient of resistance.

Upon an increase in temperature, at unity power factor, the disc 5 tends to speed up because of the diminished effect of a drag magnet 13, upon the disc 5, but the coil 10, having a lower temperature coefficient of resistance than the winding 8, is traversed by more current and the winding 8 by less current. The disc 5 is thereby slowed down to a speed that is proportional to the value of the load.

The operation of the device for correcting the inherent changes in the torque-producing system may best be explained by a conventional vector diagram.

As illustrated in Fig. 3, a vector $\phi_E$ represents the flux traversing the member 2 and caused to lag 90° the voltage of the winding 7, represented by vector $E_1$. A load current at less than unity power factor, represented by vector I, energizes the series circuit of the meter. The current I divides itself between the winding 8 and the winding 10, in such manner as may be represented by vectors $I_8$ and $I_{10}$, respectively. At normal temperatures, these currents will be in phase with each other.

At some temperature higher than normal operating temperature, the increased resistance of the winding 7 and weakening of the magnetic qualities of member 2 will cause the voltage flux $\phi_E$ to lead its former phase position and take a new value represented by $\phi'_E$. This, of itself, would cause a decrease in the speed of the disc but the phase position of the current $I_8$ also shifts with an increase in temperature. The inductance of the current winding 8 remains practically constant with an increase in temperature, so that an increase in its resistance causes a leading phase displacement and a smaller current represented by $I'_8$. It is seen that both $\phi'_E$ and $I'_8$ are smaller in magnitude but that the angle $A'$ between them is equal to angle $A$ between $\phi_E$ and $I_8$. The torque-producing qualities of $I'_8$ and $\phi'_E$ are reduced but these are compensated for by the reduction of the strength of the drag magnet 13.

It is thus seen that the power factor of the load is inherently taken care of by the function of the coil 10 for any value of temperature.

At low power factors the operation of the auxiliary coil not only corrects the magnitude of the series flux with a variation in temperature, but it also causes the phase angle of the series flux to compensate for the shifting of the voltage flux.

In a modification of my invention, the coil 10 may be of copper but, for satisfactory operation of the device, as hereinbefore disclosed, a resistor 11 of a relatively high temperature coefficient of resistance as compared with copper should be placed in series circuit relation with the current winding 8, and a resistance 12 of a relatively low temperature coefficient of resistance as compared with copper should be placed in series circuit relation with winding 10.

In order that magnetic saturation of the coil 10 may not affect the division of current between the current coils 8 and the coil 10, I prefer to provide the coil 10 with a core having an air gap of relatively great length.

Various other modifications may occur to those skilled in the art, and I desire to include all such modifications within the scope of the appended claims.

I claim as my invention:

1. A motor meter comprising a torque-producing magnet system having current and pressure windings, and means comprising an auxiliary coil of manganin wire in shunt-circuit relation to the current winding for compensating the meter for errors caused by temperature variations.

2. A motor meter comprising a torque-producing magnet system having current and pressure windings, and means including a coil comprising material having a resistance responsive to temperature changes in shunt-circuit relation to the current winding for varying the relative phase position and magnitude of current traversing the current windings in accordance with changes of temperature.

3. A motor meter comprising a torque-producing magnet system having current and pressure windings, the said current winding having a predetermined temperature coefficient of resistance, and an auxiliary reactance winding having a predetermined lower temperature coefficient of resistance than that of the current winding in shunt-circuit relation thereto for compensating the meter for errors caused by temperature variations.

4. The combination with a movable armature, of shunt and series-connected circuits in inductive relation thereto, and an inductive-resistance circuit in parallel-circuit relation with said series-connected circuit, the temperature coefficient of resistance of the said inductive resistance having a different value than the temperature coefficient of resistance of the series-connected circuit.

5. The combination with a movable armature, of shunt and series-connected circuits in inductive relation thereto, and a circuit comprising a resistor and an inductance in parallel-circuit relation with said series circuit, the temperature coefficient of resistance of said resistor having a different value than the temperature coefficient of resistance of the series-connected circuit.

6. The combination with a movable armature, of shunt and series-connected circuits in inductive relation thereto, a resistor in series-circuit relation with said series circuit, and a circuit comprising an inductance and a resistor, in parallel-circuit relation with said series-connected circuit, said resistors having different temperature coefficients of resistance.

7. An induction meter comprising a torque producing magnet system having current and voltage windings, said current winding having a predetermined temperature coefficient of resistance, and an auxiliary winding having reactance and resistance, in shunt-circuit relation with said current winding for compensating the meter for errors caused by temperature changes, said resistance of said auxiliary winding having a lower temperature coefficient than the resistance of said current winding.

8. An induction meter comprising a torque producing magnet system having current and voltage windings, said current winding having a predetermined temperature coefficient of resistance, and a circuit in parallel circuit relation with said winding, said circuit having a predetermined reactance and temperature coefficient of resistance such that the relative phase position and magnitude of the current in said winding is automatically responsive to temperature variations to thereby cause the meter to register accurately regardless of temperature changes.

In testimony whereof, I have hereunto subscribed my name this 11th day of February, 1927.

HANS NÜTZELBERGER.